(12) United States Patent
McDaniel

(10) Patent No.: US 8,912,878 B2
(45) Date of Patent: Dec. 16, 2014

(54) MACHINE GUIDANCE SYSTEM

(75) Inventor: Michael Sean McDaniel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 446 days.

(21) Appl. No.: 13/116,295

(22) Filed: May 26, 2011

(65) Prior Publication Data

US 2012/0299695 A1    Nov. 29, 2012

(51) Int. Cl.
*B60Q 1/00*   (2006.01)
*G05D 1/02*   (2006.01)

(52) U.S. Cl.
CPC ...... *G05D 1/0238* (2013.01); *G05D 2201/0201* (2013.01)
USPC ............ 340/3.1; 340/435; 340/436; 701/301; 701/23

(58) Field of Classification Search
None
See application file for complete search history.

(56) References Cited

U.S. PATENT DOCUMENTS

| 4,281,326 | A  | * | 7/1981 | Anderson | 342/41 |
| 5,995,883 | A  | * | 11/1999 | Nishikado | 701/23 |
| 7,124,027 | B1 | * | 10/2006 | Ernst et al. | 701/301 |
| 7,557,691 | B2 |   | 7/2009 | Iwama |  |
| 2003/0222812 | A1 | * | 12/2003 | Kishida | 342/109 |
| 2010/0010703 | A1 | * | 1/2010 | Coats et al. | 701/32 |
| 2011/0010020 | A1 | * | 1/2011 | Samukawa et al. | 701/1 |
| 2011/0148612 | A1 | * | 6/2011 | Nakazono et al. | 340/435 |

FOREIGN PATENT DOCUMENTS

JP    2007178183 A  *  7/2007

OTHER PUBLICATIONS

Sermanet, P. et al, "Speed-Range Dilemmas for Vision-Based Navigation in Unstructured Terrain," Courant Institute of Mathematical Sciences, New York University, Net-Scale Technologies, Morganville, NJ 07751, USA, 2007, 6 pages.
Author Unknown, "Acumine HaulCheck," http://www.acumine.com/_Products/HaulCheck.php, printed May 26, 2011, 3 pages.
Author Unknown, "Lexus-GX 2011—GX Safety & Security," http://www.lexus.com/models/GX/features/safety/lane_departure_alert.html, printed May 26, 2011, 1 page.

* cited by examiner

*Primary Examiner* — Brian Zimmerman
*Assistant Examiner* — Kevin Lau
(74) *Attorney, Agent, or Firm* — Finnegan, Henderson, Farabow, Garrett & Dunner LLP

(57) ABSTRACT

A guidance system for a machine may include a scanning device configured to detect a presence of an object within a minimum desired distance of the machine, and a controller in communication with the scanning device. The controller may be configured to compare a number of times the object is detected during a time period to a number of times the object is permitted to be detected during the time period. The controller may be configured to adjust the number of times the object is permitted to be detected. Further, the controller may be configured to output an indication, when the number of times the object is detected is equal to or greater than the number of times the object is permitted to be detected, that the object is less than the minimum desired distance from the machine.

10 Claims, 2 Drawing Sheets

MACHINE GUIDANCE SYSTEM

TECHNICAL FIELD

The disclosure relates generally to a guidance system and, more particularly, to a guidance system for a mobile machine.

BACKGROUND

Mobile machines such as, for example, off-highway haul trucks, motor graders, snow plows, and other types of heavy equipment are used to perform a variety of tasks. Some of these tasks involve carrying or pushing large, awkward, loose, and/or heavy loads up steep inclines or along rough or poorly marked haul roads. And, because of the size and momentum of the machines and/or because of poor visibility, these tasks can be difficult for a human operator to complete effectively.

To help guide the machines along the haul roads and keep the machines within appropriate lanes on the haul roads, some worksites utilize earthen berms located on one side or on both sides of the haul roads. The berms act as borders of the haul road, providing a visual indication of the edge of the road and functioning to either redirect the machine back onto the road or hinder further movement of the machine off of the road, should the machine deviate from an appropriate lane. Although effective, the use of the earthen berms alone may be insufficient to keep some large or heavily loaded machines on the haul roads and, in some situations, may damage the machines when the machines contact the berms. As such, an alternative or additional method for keeping the machines within the appropriate lanes of a haul road may be desirable.

U.S. Patent Publication No. 2010/0010703 to Coats et al., assigned to Caterpillar Inc., discloses a guidance system for such a machine. The guidance system may include a scanning device configured to generate a signal indicative of an actual lateral distance from the machine to a roadway marker, such as a berm. The system may also include a controller configured to compare the actual lateral distance to a desired distance, to keep the machine away from the marker or berm.

In some cases, however, it may not be necessary or desirable to determine the actual lateral distance between the machine and the roadway marker. For example, it may be necessary to collect and/or process large amounts of data to determine the actual lateral distance. Also, when the roadway marker is a berm, objects other than the berm may occasionally be detected, such that the determined lateral distance may not, in fact, be the real distance between the machine and the berm. Thus, the system may not be able to determine whether the machine is at least a minimum desired distance from the berm.

The disclosed guidance system, described in detail below, is directed to providing further advantages over the prior art.

SUMMARY OF THE INVENTION

The disclosure describes a guidance system for a machine, which may include a scanning device configured to detect a presence of an object within a minimum desired distance of the machine, and a controller in communication with the scanning device. The controller may be configured to compare a number of times the object is detected during a time period to a number of times the object is permitted to be detected during the time period. The controller may be configured to adjust the number of times the object is permitted to be detected. Further, the controller may be configured to output an indication, when the number of times the object is detected is equal to or greater than the number of times the object is permitted to be detected, that the object is less than the minimum desired distance from the machine.

The disclosure also describes a method of detecting that an earthen berm on a worksite is less than a minimum desired distance from a side of a machine with a scanning device mounted on a machine. The method may include detecting, with the scanning device, an object a number of times during a time period. A number of times the object is permitted to be detected during the time period may be determined based on at least one input. The number of times the object is detected may be compared to the determined number of times the object is permitted to be detected. An indication that the object is the earthen berm and that the machine is less than the minimum desired distance from the earthen berm may be output when the number of times the object is detected is equal to or greater than the determined number of times the object is permitted to be detected.

The disclosure also describes a machine, which includes a power source, a plurality of traction devices associated with the power source which are configured to permit the machine to move and to steer the machine, a scanning device configured to detect a presence of an object within a minimum desired distance of the machine, and a controller in communication with the scanning device. The controller may be configured to compare a number of times the object is detected during a time period to a number of times the object is permitted to be detected during the time period. The controller may also be configured to adjust the number of times the object is permitted to be detected. The controller may be further configured to output an indication, when the number of times the object is detected is equal to or greater than the number of times the object is permitted to be detected, that the object is an earthen berm that is located a distance less than the minimum desired distance from the machine.

DETAILED DESCRIPTION

Figure 1:
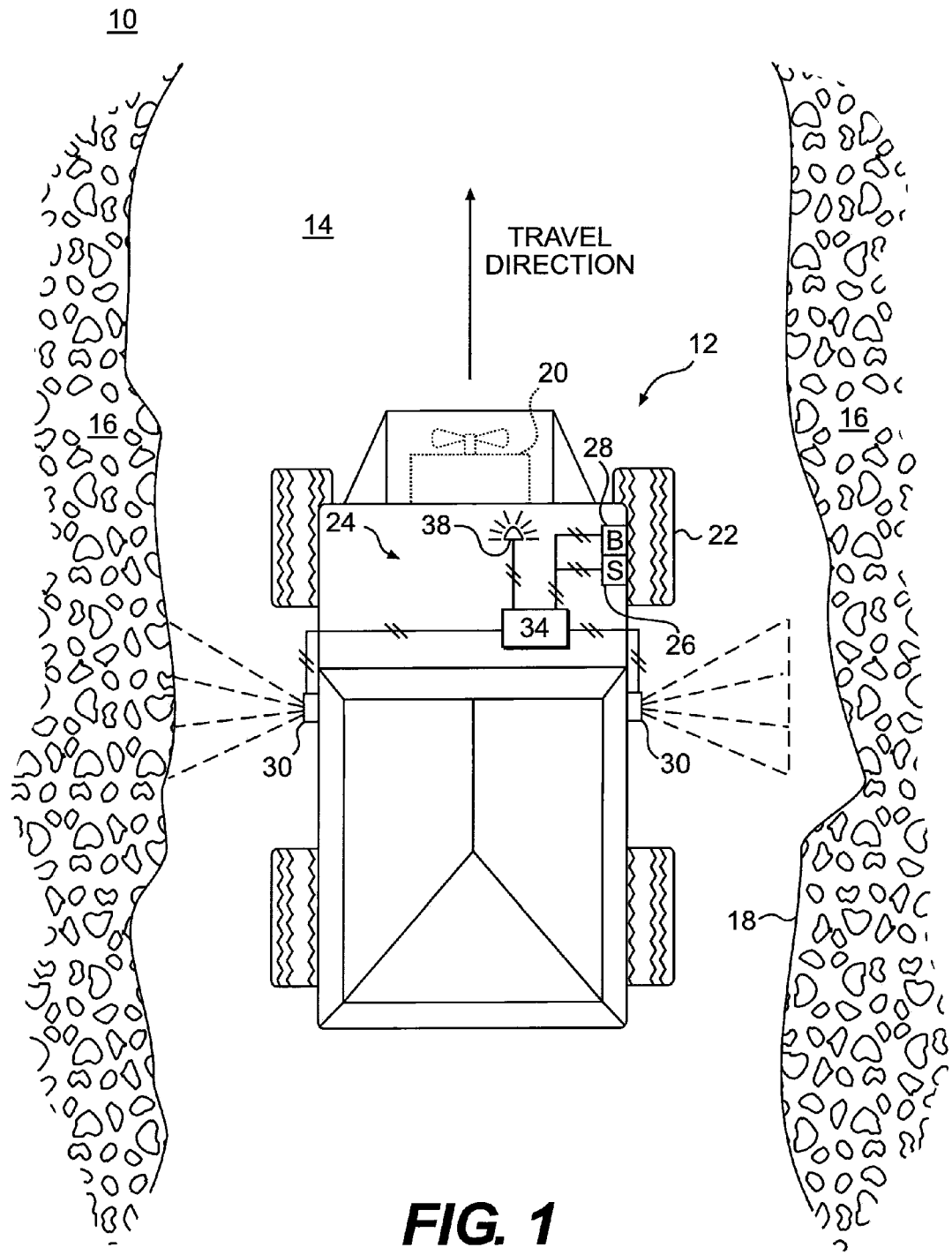
FIG. 1 is a pictorial illustration of an exemplary disclosed machine.

FIG. 1 illustrates a worksite 10 and an exemplary machine 12 performing a task at worksite 10. Worksite 10 may include, for example, a mine site, a landfill, a quarry, a construction site, or any other type of worksite having a roadway 14 traversable by machine 12. Roadway 14 may be bordered on at least one side by a marker 16, for example an earthen berm. In addition to marking a border of roadway 14, the earthen berm may also provide a barrier to machine 12 that inhibits machine 12 from leaving roadway 14 and/or redirects machine 12 toward a center of roadway 14 in the event that machine 12 contacts the earthen berm. However, it may be desirable to prevent contact between machine 12 and marker 16, to prevent damage to machine 12. Although shown in FIG. 1 as a single lane roadway, it is contemplated that roadway 14 may alternatively include multiple lanes, if desired.

The task being performed by machine 12 may be associated with altering the geography at worksite 10 and may include, for example, a hauling operation, a grading operation, a leveling operation, a plowing operation, a bulk material removal operation, or any other type of operation. As such, machine 12 may embody a mobile machine, for example a haul truck, a motor grader, a loader, or a snow plow. Machine 12 may include, among other things, a power source 20, one or more traction devices 22, and a guidance system 24. Power source 20 may generate and provide power to traction devices 22, while guidance system 24 may regulate operation of traction devices 22 and/or power source 20 in response to various inputs.

Power source 20 may embody an internal combustion engine such as, for example, a diesel engine, a gasoline engine, a gaseous fuel powered engine, or any other type of engine apparent to one skilled in the art. Power source 20 may alternatively or additionally include a non-combustion source of power such as a fuel cell, a power storage device, an electric motor, or other similar mechanism. Power source 20 may be connected to drive traction devices 22 via a direct mechanical coupling, a hydraulic circuit, an electrical circuit, or in any other suitable manner.

Traction device 22 may be a wheel, a belt, a track or any other driven traction device known in the art. Traction device 22 may be driven by power source 20 to rotate, so that machine 12 may be moved in accordance with an output rotation of power source 20. A steering device 26, for example a hydraulic cylinder, a hydraulic motor, an electric motor, and/or a rack-and-pinion configuration may be associated with one or more traction device 22 to affect steering thereof. In addition, a braking device 28, for example a compression disk brake, an internal fluid brake, an engine retarder, an exhaust brake, and/or a transmission brake may be associated with one or more traction device 22 and/or power source 20 to affect braking of machine 12.

Guidance system 24 may include multiple components that interact to regulate maneuvering of machine 12. Specifically, guidance system 24 may include one or more scanning devices 30 and a controller 34 in communication with scanning devices 30, steering device 26, and braking device 28. Controller 34 may be configured to control maneuvering (e.g., steering and/or braking) of machine 12 based on inputs received from scanning devices 30 and/or an operator of machine 12.

Scanning devices 30 may be attached to different, opposite sides (e.g., a right side as well as a left side) of machine 12, to sense whether marker 16 is within a particular range that is scanned by that scanning device 30, the particular range representing a minimum desired distance between that side of machine 12 and marker 16. Although one scanning device 30 is described, it is to be understood that the other scanning device 30 may be similarly described. Scanning device 30 may detect whether or not at least one object, which may be marker 16, is within the particular range that is scanned by scanning device 30, and may perform this detection without regard to and without determination of an actual distance between the object and scanning device 30. Scanning device 30 may be, for example, a LIDAR (light detection and ranging) device, a RADAR (radio detection and ranging) device, a SONAR (sound navigation and ranging) device, or another device known in the art. In one example, scanning device 30 may include an emitter that emits a detection beam, and an associated receiver that receives any reflection of that detection beam. Based on characteristics of the received beam, or whether the received beam is received at all, it may be determined whether marker 16 is within the particular range that is scanned by scanning device 30. Alternatively or in conjunction with the above-described examples, scanning device 30 may be a passive sensor, such as a camera.

Controller 34 may include means for monitoring, recording, storing, indexing, processing, and/or communicating whether machine 12 is within the minimum desired distance of marker 16, based on whether marker 16 is determined to be within the particular range scanned by scanning device 30. The same means, or a different means, of controller 34 may autonomously control maneuvering of machine 12 in response to this information. These means may include, for example, a memory, one or more data storage devices, a central processing unit and/or one or more other processors, or any other components that may be used to run the disclosed application. Furthermore, although aspects of the present disclosure may be described generally as being stored within memory, one skilled in the art will appreciate that these aspects can be stored on or read from different types of computer program products or tangible, non-transient computer-readable media such as computer chips and secondary storage devices, including hard disks, floppy disks, optical media, CD-ROM, or other physical forms of RAM or ROM.

Controller 34 may be configured to determine whether or not machine 12 is at least the minimum desired distance from marker 16, and respond according to this determination. Controller 34 may respond in a number of different ways. For example, when the presence of marker 16 is not detected by scanning device 30, or when marker 16 is detected by scanning device 30 but is detected less than a particular number of times during a particular time period, controller 34 may take no action, or may not respond at all. This is because controller 34 may have determined that machine 12 is located at least the minimum desired distance from marker 16. However, when marker 16 is detected by scanning device 30 equal to or greater than the particular number of times during the particular time period, controller 34 may take action or otherwise respond as discussed below. This is because controller 34 may have determined that machine 12 is located less than the minimum desired distance from marker 16. The responses for controller 34 may include warning the operator of machine 12 of possible imminent danger or recommending action for the operator to take, autonomously controlling steering device 26 to move machine 12 away from marker 16, and/or autonomously controlling braking device 28 to slow or even stop travel of machine 12 toward marker 16. The warning or recommendation may be audible, visual, or a combination of both audible and visual stimulation. For this purpose, a warning device 38 may be included within the operator station of machine 12.

In accordance with the disclosure, the particular number of times that marker 16 must be detected by scanning device 30 during the particular time period may be set by the operator of machine 12, so as to be greater than or less than a default number of times initially programmed into controller 34. That is, the operator may have a preference or requirement for the particular number of times marker 16 must be detected before controller 34 indicates machine 12 is less than the minimum desired distance from marker 16. The operator may determine the setting for the particular number of times marker 16 must be detected based on his or her skill level (e.g., a relatively skilled operator may set the particular number to be a relatively high percentage of the time, to avoid false alarms that erroneously indicate machine 12 is less than the minimum desired distance from marker 16), and/or may determine the setting based on the physical state or condition of marker 16 (e.g., when marker 16 is in relatively poor condition, the operator may set the particular number to be a relatively low percentage of the time, otherwise the condition of marker 16 may prevent scanning device 30 from ever detecting marker 16 enough times to determine machine 12 is less than the minimum desired distance from marker 16). As such, controller 34 may allow the operator to input and/or adjust the particular number of times marker 16 must be detected, at startup of machine 12 and/or during operation thereof. This input may be received by way of an operator interface device (not shown) located within an operator station of machine 12. The operator interface device may be a keyboard, a mouse, a touch screen display, a laptop computer, one or more switches, or another similar device. Further, the default number of times initially programmed into controller 34 may be based on an expected condition of marker 16, an expected level of operator skill, or any other factors.

As discussed above, controller 34 may determine that machine 12 is less than the minimum desired distance from marker 16 when scanning device 30 detects the presence of marker 16 equal to or greater than the particular number of times during the particular time period. As also discussed above, the particular number of times may be set, such as by the operator of machine 12, for example, based on the skill level of the operator and/or based on the condition of marker 16. Alternatively or in conjunction with the setting of the particular number of times, the particular time period may also be set. That is, the particular time period may be set, such as by controller 34, based on an instantaneous speed of machine 12 on worksite 10. The speed of machine 12 may be input to, or collected or otherwise received by, controller 34. For example, when machine 12 is traveling at a relatively high speed, the particular time period may be set relatively shorter, so that the warnings, recommendations, or actions provided by controller 34 may occur soon enough to prevent machine 12 from contacting marker 16. Conversely, when machine 12 is traveling at a relatively low speed, the particular time period may be set relatively longer, so that unnecessary warnings that machine 12 is less than the minimum desired distance from marker 16 are avoided, as the operator may be in the process of driving machine 12 away from marker 16.

Each scanning device 30 may be mounted and/or oriented to detect one or more objects, such as marker 16, when the object is located less than the minimum desired distance between machine 12 and the object. Thus, scanning device 30 may not detect objects, including marker 16, when the object is located farther from machine 12 than the minimum desired distance. The minimum desired distance may be based on a size, type, or other characteristic of machine 12. The minimum desired distance may also be based on the likelihood of machine 12 contacting or crossing marker 16. Specifically, if the likelihood of machine 12 contacting or crossing marker 16 is high, the minimum desired distance may be relatively higher. Similarly, if the likelihood of machine 12 contacting or crossing marker 16 is low, the minimum desired distance may be relatively lower. The likelihood of machine 12 contacting or crossing marker 16 may be affected by a roadway condition, an environmental condition (including weather), a machine condition, an operator condition, and/or other similar conditions. For example, a rough roadway having a loose or slick surface may decrease the stability of machine 12, thereby increasing the likelihood of machine 12 veering off course into contact with marker 16. Similarly, a heavily loaded, older haul truck traveling at high speed may have less stability, reduced stopping power, and/or reduced steering than a lightly loaded, newer motor grader traveling at a slower speed. Thus, the haul truck may have a greater likelihood of contacting or crossing marker 16 than the motor grader and subsequently require a greater minimum desired distance from marker 16. Further, an operator having less experience and/or a lower skill level may require more response time than an experienced operator and, thus, a greater minimum desired distance should be maintained between machine 12 and marker 16.

Similarly, the minimum desired distance may be based on a potential severity associated with machine 12 contacting or crossing marker 16. This potential severity may change based on a financial value of machine 12 and/or an amount of damage that could be caused by machine 12 leaving roadway 14. For example, when roadway 14 is adjacent an edge of a cliff, leaving roadway 14 could have significant consequences (i.e., the severity associated with machine 12 leaving roadway 14 at this location may be high). In contrast, when roadway 14 is adjacent flat, level terrain, leaving roadway 14 may have minor consequences (i.e., the severity associated with machine 12 leaving roadway 14 at this location may be low).

Figure 2:
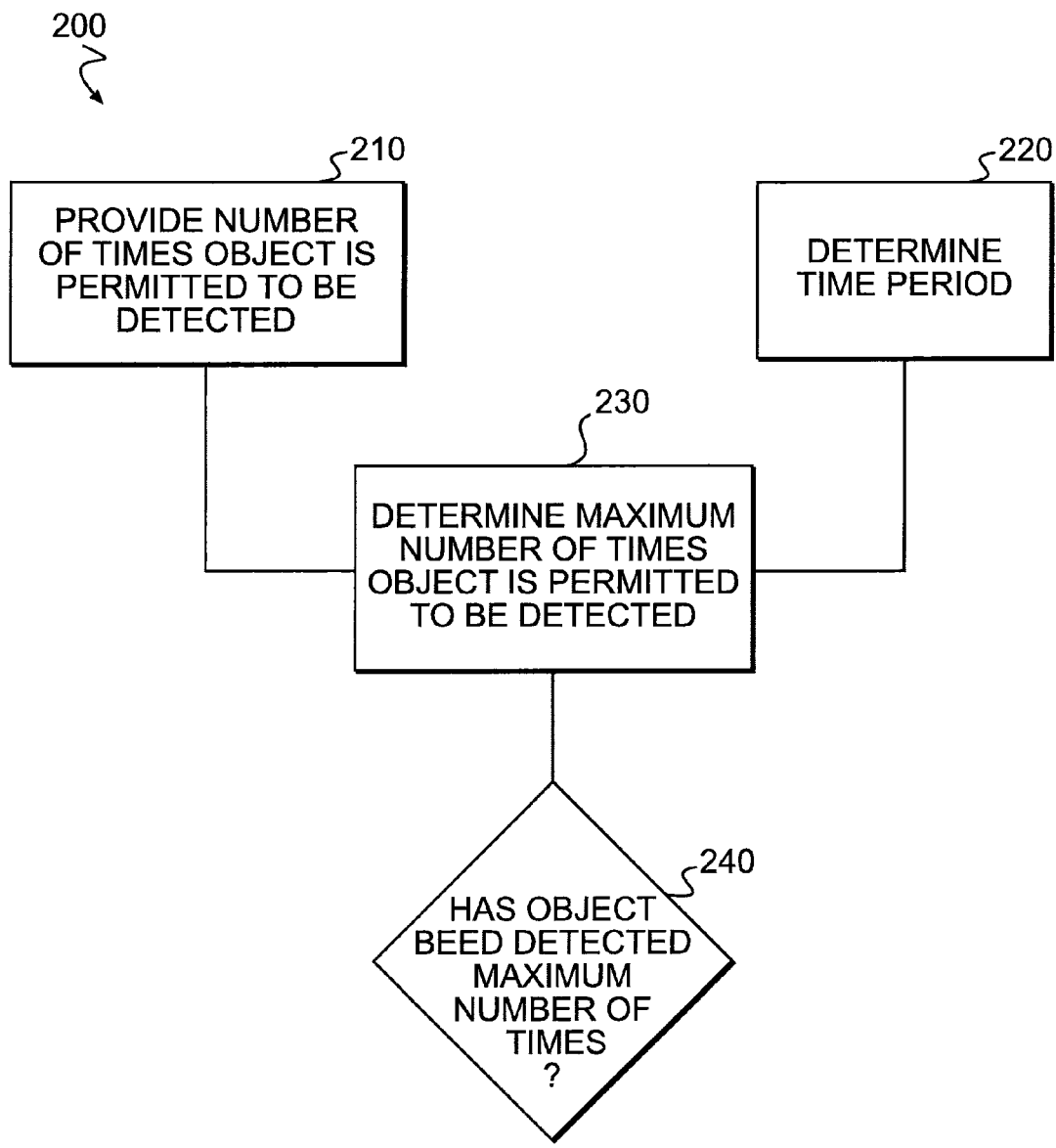
FIG. 2 is a flowchart depicting an exemplary disclosed method associated with operation of the machine of FIG. 1.

FIG. 2 illustrates an exemplary method performed by controller 34 during operation of machine 12. FIG. 2 will be described in more detail in the following section to further illustrate the disclosed system and its operation.

INDUSTRIAL APPLICABILITY

The disclosed guidance system may be applicable to any mobile machine where lane keeping and/or collision avoidance is desired. The disclosed guidance system may provide warnings and/or autonomous maneuvering in the event of lane deviation and/or approach to a roadway marker, including an earthen berm. And, the disclosed system may be adaptable and account for varying roadway conditions, environmental conditions, machine conditions, operator conditions, and other similar conditions when providing the warning or autonomously maneuvering the machine. An example of operation of guidance system 24 is described below.

Guidance system 24 may use scanning devices 30, one attached to each side of machine 12, to sense whether marker 16 is within the particular range scanned by that scanning device 30, where the particular range represents the minimum desired distance between machine 12 and marker 16. When the presence of marker 16 is not detected by scanning device 30, or when the presence of marker 16 is detected by scanning device 30 but is detected less than the particular number of times during the particular time period, machine 12 is determined to be located at least the minimum desired distance from marker 16. However, when the presence of marker 16 is detected by scanning device 30 equal to or greater than the particular number of times during the particular time period, machine 12 is determined to be located less than the minimum desired distance from marker 16. Thus, it is understood that the detection of marker 16 equal to or greater than the particular number of times during the particular time period may be considered to be and treated as an actual detection of marker 16, such that machine 12 may be determined actually to be located less than the minimum desired distance from marker 16. Conversely, when marker 16 is detected less than the particular number of times during the particular time period, either objects that are not marker 16 were detected or machine 12 was but is no longer located less than the minimum desired distance from marker 16.

By way of specific non-limiting examples in accordance with the disclosure, the minimum desired distance between each side of machine 12 and marker 16 may be between about 1 meter and about 4 meters. Thus, each scanning device 30 may be mounted to the side of machine 12 to detect objects, such as marker 16, within that scanning range, and therefore may be mounted so as to be unable to detect any objects outside that scanning range.

Alternatively, or in conjunction with the above, the particular number of times may be expressed as a percentage, which is equal to a maximum number of times an object is permitted to be detected by scanning device 30 during the particular time period, divided by the total number of times scanning device 30 has scanned or will scan for object during the particular time period. The particular time period may be made up of a number of smaller time periods (e.g., time cycles). Thus, the maximum number of times the object is permitted to be detected may be equal to the maximum number of time cycles in which the object is permitted to be detected. Similarly, the total number of times is equal to the number of time cycles in the particular time period. In particular, the percentage may be between about 50 percent and about 70 percent, about 80 percent, or about 90 percent. For example, when marker 16 is a berm that is in relatively poor condition, the percentage may be set to be about 50 percent. But, when marker 16 is a berm that is in relatively good condition, the percentage may be about 80 percent or about 90 percent.

As stated above, the particular time period may be made up of a number of smaller time periods or time cycles. In particular, each of the time cycles may be an 80 millisecond cycle. And, the particular time period may be a maximum of 128 of the 80-millisecond cycles, for a particular time period of 10.24 seconds. Further, the particular time period may be reduced based on the instantaneous speed of machine 12 on worksite 10. Specifically, the speed of machine 12, in miles-per-hour (MPH), may be multiplied by a factor, such as 3, with the resulting product subtracted from the maximum number of cycles.

So, when machine 12 travels on worksite 10 at a speed of 10 MPH, the particular time period may be equal to (128 cycles–(3×10) cycles), or 98 cycles, each of which is 80 milliseconds long, resulting in the particular time period being 7.84 seconds long. When marker 16 is a berm in relatively good condition, the particular number of times may be set to 80 percent. Thus, when scanning device 30 detects marker 16 for 80 percent or more of the 98 cycles, or more than 78 cycles (i.e., more than 6.24 seconds of the 7.84 second particular time period), machine 12 is determined to be located less than the minimum desired distance from marker 16. Controller 34 then gives the above-discussed warnings or recommendations, or takes further action to control machine 12.

Consistent with the disclosure, controller 34 may include a counter for counting inputs from a corresponding one of scanning devices 30. When the particular number of times is set (e.g., 50%), and machine 12 is traveling such that the instantaneous speed of machine 12 is known (e.g., 5 MPH), controller 34 may determine the particular time period as well as the maximum number of cycles during which marker 16 may be detected before machine 12 is determined to be less than the minimum desired distance from marker 16, in accordance with the above disclosure. So, when the speed of machine 12 is 5 MPH, the particular time period may be ((128 cycles)–(3×5)) cycles, or 113 cycles. When the particular number of times is 50%, detection of marker 16 by scanning device 30 more than 56 cycles out of any 113 cycle period may mean that machine 12 is determined to be less than the minimum desired distance from marker 16. This procedure may be implemented by using each counter, when appropriate, as follows: for each time cycle that scanning device 30 detects marker 16, the counter increases by 1, while each time cycle that scanning device 30 does not detect marker 16, the counter decreases by 1. In accordance with the above example, when the counter value is greater than 56, controller 34 may determine that machine 12 is less than the minimum desired distance from marker 16. Conversely, when the counter value is 56 or less, controller 34 may determine that machine 12 is at least the minimum desired distance from marker 16.

As described above, an increase or a decrease in the instantaneous speed of machine 12 may result in the processor determining a different particular time period, as well as a different maximum number of cycles during which marker 16 may be detected before machine 12 is determined to be less than the minimum desired distance from marker 16.

When roadway 14 is relatively narrow, markers 16 on both sides of machine 12 may be detected simultaneously by scanning devices 30. This may otherwise result in controller 34 indicating that machine 12 is too close to markers 16 on both sides of machine 12. However, in such cases it may not be possible to take any action to achieve the minimum desired distance between either side of machine 12 and markers 16. In such situations, each of the counters may be programmed or otherwise instructed to decrease by 1 for each cycle that both scanning devices 30 detect markers 16.

Controller 34 may be programmed such that the opposite sides of machine 12 are scanned over time periods of different lengths. For example, the side of machine 12 closer to the earthen berm may be scanned over a longer time period than the side of machine 12 closer to oncoming traffic. Thus, controller 34 may be programmed to provide a warning earlier when machine 12 is less than a desired distance from other vehicles.

FIG. 2 illustrates an exemplary method performed by controller 34 during operation of machine 12. As shown in FIG. 2, method 200 includes step 210 of providing to controller 34 a number of times marker 16 is permitted to be detected before machine 12 is determined to be less than the minimum desired distance from marker 16. Consistent with the above disclosure, this number may be a percentage, and may be based on either or both the skill of the operator or the condition of marker 16. The operator may set this percentage.

Method 200 also includes step 220 of determining by controller 34 a time period during which scanning device 30 will scan for marker 16. Consistent with the above disclosure, this number may be a time period made up of smaller time periods or time cycles, and may be adjusted based on the instantaneous speed of machine 12.

In step 230, controller 34 may determine the maximum number of times marker 16 is permitted to be detected before machine 12 is determined to be less than the minimum desired distance from marker 16. Consistent with the above disclosure, this is based on the number and time period.

In step 240, controller 34 may determine whether the current number of times marker 16 has been detected is equal to or greater than the maximum number of times. If YES, controller 34 may determine machine 12 is less than the desired minimum distance from marker 16. Warnings, recommendations, and/or autonomous action may be taken by controller 34. If NO, controller 34 may determine machine 12 is at least as far from marker 16 as the minimum desired distance. Controller 34 may, therefore, take no action.

It will be apparent to those skilled in the art that various modifications and variations can be made to the guidance system of the present disclosure. Other embodiments of the method and system will be apparent to those skilled in the art from consideration of the specification and practice of the guidance system disclosed herein. It is intended that the specification and examples be considered as exemplary only, with a fuller scope of the disclosure being indicated by the following claims and their equivalents.

What is claimed is:
1. A guidance system for a machine, comprising:
 a scanning device configured to detect a presence of an object within a minimum desired distance of the machine; and
 a controller in communication with the scanning device, the controller being configured to:

compare a number of times the object is detected during a time period to a number of times the object is permitted to be detected during the time period, the controller being configured to adjust the number of times the object is permitted to be detected based at least on at least one input indicative of a physical condition of the object;

output an indication, when the number of times the object is detected is equal to or greater than the number of times the object is permitted to be detected, that the object is less than the minimum desired distance from the machine; and reduce the number of times the object is permitted to be detected to a percentage of less than about 70% in response to a first input corresponding to the physical condition of the object, and (ii) to increase the number of times the object is permitted to be detected to a percentage of at least about 70% in response to a second input corresponding to the physical condition of the object, and wherein the controller configured to reduce the time period from 128, 80 millisecond cycles, by a number of 80 millisecond cycles equal to 3 multiplied by an instantaneous speed of the machine in miles-per-hour.

2. The guidance system of claim 1, wherein the scanning device is configured to detect an earthen berm as the object.

3. The guidance system of claim 1, wherein the scanning device is configured to detect an earthen berm as the object, and the controller is configured to increase or to reduce the number of times the berm is permitted to be detected in response to an input corresponding to a physical condition of the berm.

4. The guidance system of claim 1, wherein the scanning device is configured to detect an earthen berm as the object, and the controller is configured (i) to reduce the number of times the berm is permitted to be detected in response to a first input corresponding to a physical condition of the berm, and (ii) to increase the number of times the berm is permitted to be detected in response to a second input corresponding to the physical condition of the berm, and wherein the controller is configured to reduce the time period by a factor related to an instantaneous speed of the machine.

5. The guidance system of claim 1, wherein the scanning device is configured to detect an earthen berm as the object, and the controller is configured (i) to reduce the number of times the berm is permitted to be detected to a percentage of at least about 50% in response to a first input corresponding to a physical condition of the berm, and (ii) to increase the number of times the berm is permitted to be detected to a percentage of greater than about 50% in response to a second input corresponding to the physical condition of the berm, and wherein the controller is configured to reduce the time period from 128, 80 millisecond cycles, by a number of 80 millisecond cycles equal to 3 multiplied by an instantaneous speed of the machine in miles-per-hour.

6. A method of detecting that an earthen berm on a worksite is less than a minimum desired distance from a side of a machine with a scanning device mounted on a machine, the method comprising:

detecting, with the scanning device, an object a number of times during a time period;

determining a number of times the object is permitted to be detected during the time period, based on at least one input indicative of a physical condition of the object;

comparing the number of times the object is detected to the determined number of times the object is permitted to be detected;

outputting an indication that the object is the earthen berm and that the machine is less than the minimum desired distance from the earthen berm when the number of times the object is detected is equal to or greater than the determined number of times the object is permitted to be detected; and reducing the number of times the earthen berm is permitted to be detected to a percentage of less than about 70% in response to a first input corresponding to a physical condition of the earthen berm, and (ii) to increase the number of times the earthen berm is permitted to be detected to a percentage of at least about 70% in response to a second input corresponding to the physical condition of the earthen berm, and wherein the controller is configured to reduce the time period from 128, 80 millisecond cycles, by a number of 80 millisecond cycles equal to 3 multiplied by an instantaneous seed of the machine in miles-per-hour.

7. The method according to claim 6, further including:
reducing the time period from a maximum time period, based on an instantaneous speed of the machine on the worksite.

8. The method of claim 6, further including:
generating an alarm, generating a recommendation, or autonomously controlling the machine based on the output indication.

9. The method of claim 6, wherein determining the number of times the object is permitted to be detected comprises receiving a user input of the number of times the object is permitted to be detected during the time period.

10. A machine, comprising:
a power source;
a plurality of traction devices associated with the power source, the traction devices configured to permit the machine to move and to steer the machine;
a scanning device configured to detect a presence of an object within a minimum desired distance of the machine; and
a controller in communication with the scanning device, the controller being configured to:
compare a number of times the object is detected during a time period to a number of times the object is permitted to be detected during the time period, the controller being configured to adjust the number of times the object is permitted to be detected based at least on at least one input indicative of a physical condition of the object;
output an indication, when the number of times the object is detected is equal to or greater than the number of times the object is permitted to be detected, that the object is an earthen berm that is located a distance less than the minimum desired distance from the machine; and
reduce the number of times the earthen berm is permitted to be detected to a percentage of less than about 70% based on a first input corresponding to a physical condition of the berm and (ii) to increase the number of times the earthen berm is permitted to be detected to a percentage of at least about 70% based on a second input corresponding to the physical condition of the berm, and wherein the controller is further configured to reduce the time period from 128, 80 millisecond cycles, by a number of 80 millisecond cycles equal to 3 times an instantaneous speed, in miles-per-hour, of the machine.

* * * * *